United States Patent [19]
Erickson et al.

[11] 4,093,361
[45] June 6, 1978

[54] COMPOSITE PROSTHETIC POLYMERIC DEVICES

[75] Inventors: Charles E. Erickson; Amar N. Neogi, both of Seattle, Wash.

[73] Assignee: Precision Cosmet Co., Inc., Minneapolis, Minn.

[21] Appl. No.: 464,734

[22] Filed: Apr. 29, 1974

Related U.S. Application Data

[63] Continuation of Ser. No. 198,544, Nov. 15, 1971, abandoned.

[51] Int. Cl.² .............................................. G02C 7/04
[52] U.S. Cl. .................................................. 351/160
[58] Field of Search .................................. 351/160–162

[56] References Cited
U.S. PATENT DOCUMENTS

| | | | |
|---|---|---|---|
| 2,241,415 | 5/1941 | Moulton | 351/160 X |
| 2,976,576 | 3/1961 | Wichterle et al. | 351/160 X |
| 3,220,960 | 11/1965 | Wichterle et al. | 351/160 X |
| 3,499,862 | 3/1970 | Wichterle | 351/160 X |
| 3,619,044 | 11/1971 | Kamath | 351/160 |
| 3,628,988 | 12/1971 | Stol et al. | 351/160 X |
| 3,639,524 | 2/1972 | Seiderman | 351/160 X |
| 3,699,089 | 10/1972 | Wichterle | 351/160 X |
| 3,758,448 | 9/1973 | Stamberger | 351/160 X |

Primary Examiner—Paul A. Sacher
Attorney, Agent, or Firm—David L. Garrison

[57] ABSTRACT

A new concept in polymeric prosthetic devices having a portion thereof composed of a hydrophilic polymer is described herein in which distortions and stresses upon the device due to water absorption are minimized or eliminated. Physical properties of the various portions of the device may thus be varied to provide the particular physical parameters required. Compositions of matter and methods of manufacturing the novel prosthetic devices are described. The composition of matter is a polymer which includes a water soluble solid inert substance removable by exposure to water during hydration of the hydrophilic portion of the device, thus eliminating distortions and stresses therein. The hydrophilic polymer described is useful, for example, as one component part of such prosthetic devices as a hard-soft contact lens, cardiovascular implants, etc. useful in aqueous environment wherein stress and deformation of the polymer shape due to hydration must be minimized.

8 Claims, 3 Drawing Figures

COMPOSITE PROSTHETIC POLYMERIC DEVICES

This is a continuation of application Ser. No. 198,544, filed Nov. 15, 1971, now abandoned.

This invention relates to polymer shapes wherein at least a portion of the shape comprises a hydrophilic polymer and especially to prosthetic devices useful in an aqueous environment wherein stress and distortion due to absorption of water into the polymer matrix must be minimized.

This invention further relates to contact lens manufacture wherein a lens is produced having a gradation or variation in physical properties from the center zone to the peripheral skirt zone of the lens.

This invention relates specifically as to one variant form thereof to a novel contact lens having a relatively harder center portion and a softer hydrophilic peripheral skirt.

This invention further relates to a polymeric composition of matter and more particularly to a hydrophilic polymer useful in the preparation of contact lenses and other prosthetic devices.

Various types of hydrophilic materials have been proposed heretofore for use as prosthetic devices and particularly for plastic contact lenses. Hydrogels formed from materials such as hydroxyalkyl methacrylates which contain hydrophilic groups with an affinity for water and aqueous solvents in which a sparingly cross-linked hydrogel structure is provided have been used to form such lenses. It has been found, however, that contact lenses produced from such hydrogels which have a soft jelly-like elastic consistency are difficult to apply and remove from the eyes. Occasional scratching and abrasions results from the forceful nature of the operation necessary to remove such a lens from the eyeball. This is due to the fact that this prior art type of contact lenses do not ride on the cornea of the eye on a layer of tears but rather attach themselves to the epithelium of the cornea in a manner which alters the metabolic outflow of fluid from the anterior chamber of the eye.

Another form of hydrophilic plastic contact lenses has been proposed wherein the hydrophilic polymer used to make the lenses is prepared from a mixture of about 50 to about 95% by weight of an hydroxyalkyl acrylate or methacrylate, a minor amount up to about 35% by weight of an alkyl acrylate or methacrylate and from about 1 to about 50% by weight of a cross-linking monomer. While providing an alternative material for use in contact lenses which exhibits improved water wetting characteristics, the polymer structure so formed exhibits brittleness during the curing and fabricating operations necessary for formation of contact lenses and does not polish well. Lenses prepared from this material deteriorate with time and during usage such that the lenses have a tendency to flatten out and become distorted, thus altering the corrective power and other lens parameters. Lenses formed from this material also tended to dry quickly when exposed to air and exhibit in a relatively low strength during handling after hydration.

It is also known to provide a contact lens having a hard center area combined with a relatively softer peripheral skirt shaped to conform with the surface of the eyeball. British Patent No. 1,045,065 issued to John Trevor DeCarle discloses the concept of having a center lens comprised of the usual materials utilized for conventional hard plastic lenses, such as acrylic plastics of high optical quality, surrounded by a softer polymer skirt. This reference indicates that epoxy resins may advantageously be used as the material of the lens. The skirt material is chosen from a compatible polymer such as soft epoxy plastics, polyvinyl chloride, copolymers of vinyl chloride and vinyl acetate and fluorinated copolymers of ethylene with propylene and polyester plastics.

When it was attempted to combine the teachings of the prior art to provide a contact lens having a hard center and a soft hydrophilic skirt, it was discovered that substantial residual stresses and resultant distortions were encountered upon hydration. When the skirt material was made of the conventional well-known hydrophilic materials utilized in the prior art to form hydrophilic soft contact lenses and combined with the well-known hard contact lens materials for the center lens portion an acceptable product could not be obtained. Severe distortion and occasional complete disintegration of the composite lenses resulted upon hydration.

Similarly, in other prosthetic devices such as cardiovascular equipments, intrauterinal devices, valves, tubing and other body implants wherein a hydrophilic surface is adhered to the device stresses from hydration have been found to result in spalling of the coating and other types of failures due to unequal swelling or other distortions induced by water absorption.

It is one primary object of this invention to provide a prosthetic device constructed at least in part from a hydrophilic polymer material which does not exhibit substantial stresses, distortion and swelling upon hydration.

Another primary objective of this invention is to provide a novel hydrophilic polymer composition which results in an unstressed, undistorted and unswollen shape after polymerization and hydration thereof.

It is another object of this invention to provide a contact lens having a gradation of physical properties from the center thereof to the outer peripheral skirt.

It is a further object of this invention to provide a new polymer composition which is soft and hydrophilic in nature and which exhibits excellent properties in the fabrication of contact lenses including high strength after hydration, no deterioration with time, relatively slow release of hydrated water upon exposure to air, good optical characteristics and ease of fabrication into contact lenses including taking an excellent polish.

It is a still further object of this invention to provide a means for eliminating stress and distortion of hydrophilic polymers upon exposure to water.

One specific object of this invention is to provide a contact lens having a relatively harder center and a softer hydrophilic peripheral skirt in which the stresses and distortions resulting from hydration of the polymer structure are minimized or eliminated.

This invention provides for a new type of prosthetic device and for a new composition of matter for use in the manufacture of such devices and in particular contact lenses and other types of hydrophilic polymer structures utilized in a aqueous environment in which substantial amounts of distortion of the object cannot be tolerated. The contact lens or other prosthetic device provided by this invention may have a gradation of properties such as hardness, color, density, water absorption, photochromicity, light transmittance, opacity, refractive index and pigmentation from one portion thereof to another without residual stresses and distortions induced upon hydration of the hydrophilic polymer used. The peripheral skirt area of the lens is a hydrophilic copolymer formed from a water soluble vinyl monomer copolymerized with a hydrophilic water insoluble monomer in the presence of a cross-linking agent and a quantity of a water soluble inert substance. This inert substance is substantially removable by exposure of the polymer to water. Upon exposure to water, a substantial portion of the water soluble inert substance is removed from the polymer matrix and replaced by water to form the soft hydrophilic polymer structure desirable for use in contact lenses. Stresses and distortions of the shape of the lens are minimized or eliminated by simply exchanging the water soluble inert substance for water in the polymer matrix. The center area of a contact lens may have a different composition to provide a gradation in the physical characteristics of the lens. The center area may be composed of a relatively harder polymer such as an extensively cross-linked copolymer of methoxyethyl methacrylate and hydroxyethyl methacrylate in combination with a cross-linking agent, the relative amounts of the constituents being chosen to give a greater hardness for the center section than the peripheral skirt.

One method of forming the contact lens of this invention is to polymerize a rod-like member of the diameter of the center section, for example, approximately 6 to 7 millimeters in diameter. For the center of the contact lenses a polymer system is usually chosen which results in a relatively hard copolymerized structure. A compatible polymer system which will form a hydrophilic polymerized outer cylindrical portion having a lower degree of hardness is then polymerized about the outside of the rod-like member. A suitable water soluble inert substance which will not interfere with the polymerization is dissolved throughout the matrix of the polymerization system used to form the outer portion of the rod. This water soluble inert substance is provided to eliminate or minimize the stresses and distortions resulting from hydration of the hydrophilic polymer upon exposure to water.

Another method of forming the contact lens of this invention is to polymerize a rod of a size equal to the outside diameter of the lens, e.g. 14 mm., the polymerization mixture containing a water soluble inert substance. In a hole drilled at the center of this rod of the size equal to the center of the lens is polymerized a material compatible with the outer material. The resulting composite rod has a coaxial cylindrical configuration with the outer layer having properties differing from the center core. If a gradation of properties are desired the process may be repeated as many times as desired, each successive drilling and filling operation using successively smaller diameter drills. The fill material used is a monomer mixture which will result in a polymer structure having properties differing from the adjacent polymer structure. For example, the interior portion may have a harder, non-hydrophilic polymer composition as compared to the peripheral portion, or other physical properties of the polymers may be varied as desired.

In the fabrication of the composite rod-like blank discussed above one can incorporate one or more markers for identifying the finished lenses. For example, it is common practice to mark one of the two lenses manufactured for a patient so that the patient may identify the proper lens for the right or left eye. By incorporating a strand or small rod of colored or opaque material in the outer peripheral portion of the composite rod or in any other suitable location all lenses cut from the blank so marked would carry the identifying indicia. The rod or strand may be of any material compatible with the polymer system used. For example, a small carbon rod, a polymerized thread such as dacron or nylon or any rod made of a colored plastic resin may be used so long as it does not dissolve nor interfere with the polymerization of the monomers used and so long as it will readily grind and polish along with the rest of the composite rod material into a contact lens shape.

In one preferred embodiment of this invention the resulting composite rod member which is utilized for making the contact lenses comprises an inner rod of a relatively harder polymer structure surrounded by a somewhat softer hydrophilic material containing a water soluble inert substance which is removed from the polymer matrix by contact with water during which the hydrophilic polymer material takes up water and becomes hydrated.

The composite rod structure enables the skilled optical technician to fabricate contact lenses of many types by ordinary techniques. Special types of lenses may also be fabricated including cylinders, myodisc, lenticulars, prisms, truncations and other special types of lenses which can be formed from the well-known hard methyl methacrylate type lens materials but which cannot be fabricated, or at best are difficult to fabricate, from the soft hydrophilic type materials of the prior art. Residual astigmatism is corrected by virtue of the fact that the relatively harder center does not conform to the shape of the cornea but rather forms the exterior of the cornea into the desired shape. The relatively softer peripheral skirt makes the lens comfortable to wear. The composite structure may be designed to control fluid flow beneath the lens so that the lens maintains a comfortable cushion of fluid as a lubricant between itself and the eye surface.

One specific embodiment of the contact lens has gradation from center to edge in either the color or opacity so that the light transmittance therethrough is altered. A totally opaque center lens or a center lens which is merely translucent to light would be useful in therapeutic purposes in cases of strabismus (cross eyes) and other defects in one eye in which it is desired to block out light from the eye or prevent the formation of an image so that the other eye will be utilized and strengthened. The present procedure used by the ophthalmologist to correct this problem is to blank out the good eye completely by use of an eye patch forcing the non-dominant eye to function alone. This is accomplished by placing a patch over the eye or using a black occluder on the glasses of the individual. This technique is not practical for use with infants and youngsters who do not understand the need for such measures and further is not desirable from a cosmetic point of view. In this specific embodiment of this invention a clear or translucent skirt area is used to aid the ophthalmologist in evaluating the fit of the contact lens more easily than would be possible if the entire lens were opaque or black. In addition a totally black lens would be unsightly and detrimental to the appearance of the patient. Lenses having a colored opaque center portion tinted to match the wearer's other eye can be utilized for this purpose to minimize any of the undesirable appearance aspects of the central occlusion present over the patient's pupil.

These and other objects and attributes of this invention will become more readily apparent from an evaluation of the following detailed description taken in conjunction with the attached drawings.

Figure 1:
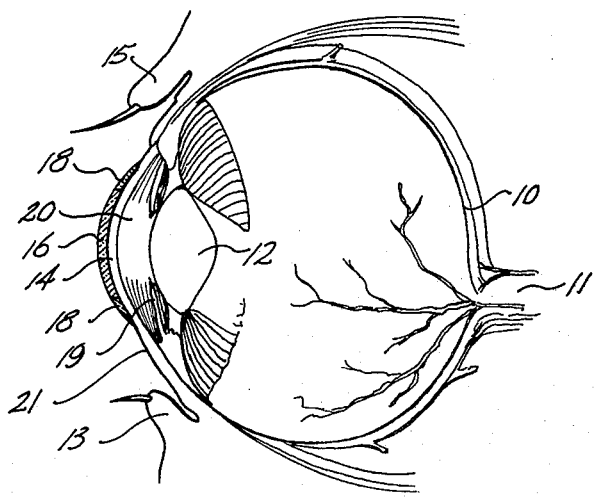
FIG. 1 is an enlarged vertical sectional view of an eye with a contact lens attached thereto made according to the herein described invention.

Referring more particularly to the drawings wherein like numerals indicate like parts, there is seen in FIG. 1 a cross-sectional view of an eyeball having a contact lens of this invention applied thereto. The eyeball shown in FIG. 1 is comprised of a retina 10, optic nerve 11, a crystalline lens 12, a cornea 14, an iris 19, anterior chamber 20, lower eyelid 13 and upper eyelid 15. The central portion 16 of the contact lens of this invention is formed from a polymeric material having a set of properties suited to the particular usage intended as more fully set forth below. A peripheral skirt portion 18 is attached to the central portion 16 and is formed from a polymeric material having a set of properties diverse from those of the central portion 16 as set forth more fully below. The central portion 16 of the lens shown in FIG. 1 is of sufficient diameter to cover the aperture formed by iris 19 and engages the substantially spherical portion of cornea 14. The peripheral skirt portion 18 of the contact lens shown in FIG. 1 has the interior portions thereof ground to a curve differing somewhat from the central portion 16 so that the peripheral skirt fits properly against the limbal area 21 of the cornea 14 without abrasion thereof.

Figure 2:
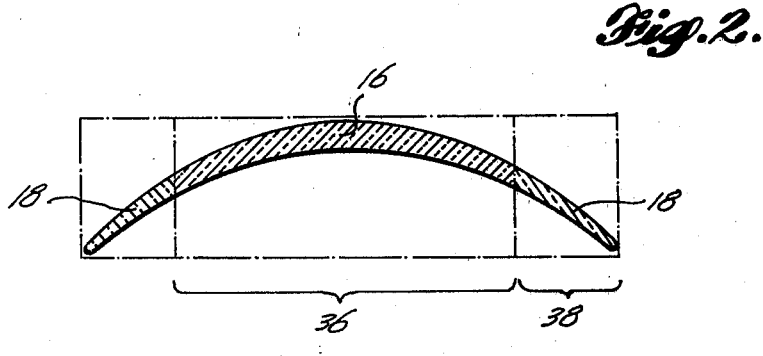
FIG. 2 is a cross-sectional view of one form of a contact lens of this invention showing one method of construction thereof.

In FIG. 2 there is seen a cross-sectional view of the lens shown in FIG. 1 as it is formed from a blank comprising a composite rod-like member having a central portion 36 and a surrounding portion 38. The central portion 36 is made up of a polymeric material having a first set of properties. This portion of the rod comprises a water soluble vinyl monomer which may be homopolymerized or copolymerized with other monomers and cross-linking agents. The relative compositions of the constituents of central portion 36 are chosen to provide a polymeric structure having the particular set of physical characteristics desired for the particular application contemplated. Around the central portion 36 there is a surrounding portion 38 comprising a copolymerized structure of a water soluble vinyl monomer with a compatible water insoluble hydrophilic monomer and a cross-linking agent. A water soluble inert substance is dispersed throughout this polymer matrix. The relative compositions of the monomers are again chosen to provide the particular set of physical characteristics desired for the particular application contemplated. Additional layers may be polymerized around the outside of the composite rod if desired. The composite rod is then cut into suitable segments such as is shown in FIG. 2 and ground into the composite lens structure shown therein. Coloring agents, opacifiers or other additives may be added to one or more of the layers of the composite rod to change the physical characteristics thereof. For example, in the unusual situation wherein severe damage has occurred to the iris and adjacent eye tissue it is possible to form an artificial iris by placing a pigment material in the outer skirt area to prevent transmittance of light. Special coloring and tinting of the lens for specialized purposes may be accomplished in this manner also.

Figure 3:
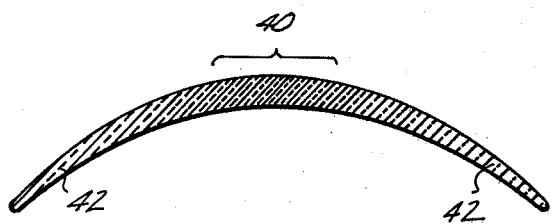
FIG. 3 shows a second embodiment of the contact lens of this invention.

In FIG. 3 a second embodiment of this invention is shown wherein the physical properties thereof are caused to vary from the central portion 40 to the peripheral area 42 in a gradual fashion. The lens shown in FIG. 3 has a higher degree of hardness in the central portion 40 with the peripheral skirt area 42 being of a softer polymer structure. This lens is fabricated by polymerizing a polymer system in the desired shape and then controlling subsequent cross-linking by selective irradiation of certain areas of the polymer shape or by other well-known techniques for selectively inducing cross-linking and further polymerization in polymer systems.

The composite lens described above with respect to FIGS. 1 and 2 may have the properties of hydrophilicity and hardness varying from the central portion 36 to the outer portion 38 without inducing stresses and distortions upon hydration by the inclusion of a water soluble inert substance added to the monomer mixture prior to polymerization. Removal of this substance during the hydration step of the hydrophilic polymer decreases or eliminates stresses and distortions of the polymeric shape. If it is desired to have a central portion 36 of a higher degree of hydrophilicity or only slightly harder than the peripheral skirt area 18, it is helpful to have a smaller percentage of the water soluble substance incorporated in the polymer system utilized to form the central portion 36.

In attempting to construct a contact lens having a hard center and a soft peripheral skirt, it was found that the prior art techniques and compositions of matter were unworkable for forming the lenses. Several unsuccessful attempts were undertaken as outlined below. All percentages listed are weight percent.

In seeking to form a lens with a hard center and a softer edge, a mixture of 60% methoxyethyl methacrylate, and 2% of 1,5-divinyloxy-3-oxapentane was copolymerized with 38% hydroxyethyl methacrylate in the presence of azobisisobutyronitrile (AIBN) as catalyst in a polyethylene tube flushed with nitrogen. The tube was heated to 40° C. and maintained there for a period of 30 hours. The resulting rod was cured at 60° C. for 10 hours. This rod was then taken out and turned down to diameter of 7 mm. A mixture of 20% of methoxyethyl methacrylate and 77% hydroxyethyl methacrylate with 2% of 1,5-divinyloxy-3-oxapentane and 1% AIBN was then polymerized at 40° C. under nitrogen around the rod formed above for 30 hours. The composite rod was then further cured at 60° C. for 10 hours. A lens was cut from this material and subsequently placed in distilled water for hydration. The lens showed flattening and distortion of the edge. The curvature of the edge portion was significantly altered as compared to the curvature prior to hydration. The structure was rejected due to the severe distortion and stresses and changes in lens parameters resulting from absorption of water into the hydrophilic polymer matrix.

Several other trials using composite blanks having various center materials comprised of 30 to 70% methoxyethyl methacrylate with 2% cross-linking agent and the remainder of the system being hydroxyethyl methacrylate with a peripheral edge material consisting of 65 to 95% hydroxyethyl methacrylate with 2% cross-linking agent and the remainder being methoxyethyl methacrylate with AIBN catalyst resulted in similar failures to obtain the desired material. Several of the lenses so manufactured shattered upon hydration, and the remainder of the lenses showed a substantial distortion to the extent of being unacceptable. It was observed that this composition of matter when used as a homogeneous polymer material for soft hydrophilic lenses exhibited substantially improved properties over the prior art compositions including ease of fabrication, polish and stability on usage but was unworkable as a hard-soft contact lens due to distortion upon hydration.

It was discovered that an acceptable lens could be formed by the inclusion of a water soluble substance within the polymer matrix prior to hydration resulting in little or no distortion and stress of the polymer matrix upon hydration. The following examples are representative of laboratory results demonstrating successful formation of a composite contact lens from hydrophilic polymer materials.

EXAMPLE I

A 7 mm. diameter rod comprising a cross-linked copolymer of methoxyethyl methacrylate (40%) and hydroxyethyl methacrylate (58%) cross-linked with 2% of 1,5-divinyloxy-3-oxapentane as a cross-linking agent copolymerized with AIBN as catalyst was formed as described above. A mixture of 30% polyoxyethylene glycol, 15.5% methoxyethyl methacrylate and 52.4% hydroxyethyl methacrylate with 2% of 1,5-divinyloxy-3-oxapentane in the presence of 0.1% AIBN as a catalyst was copolymerized around the previously formed rod. The mixture was polymerized at 40° C. for 30 hours and was subsequently cured at 60° C. for 10 hours. The composite rod was turned down to a diameter of 14 mm. and cut into cylindrical segments from which contact lenses were fabricated. Upon hydration, a hard-soft lens resulted with no distortion of the radii of curvature as ground prior to hydration. The lenses had a central portion to outer portion hardness ratio of 2:1.

EXAMPLE II

Around a 6 mm. rod of a cross-linked copolymer of methoxyethyl methacrylate (95%) and hydroxyethyl methacrylate (2%) cross-linked with 3% of ethyleneglycol dimethacrylate was polymerized a mixture of 40% polyoxyethylene glycol, 12% methoxyethyl methacrylate, 46% hydroxyethyl methacrylate and 1.5% ethyleneglycol dimethacrylate in the presence of 0.5% AIBN at 42° C. for 24 hours. The composite rod was cured at 60° C. for 12 hours. The material was turned down to a rod from which a lens was fabricated. On hydration a lens resulted with a comparatively harder center and softer edge. The hardness of the center compared to the edge was about 20:1. No distortion nor stress of the softer edge structure was observed.

EXAMPLE III

Around a rod (6 mm. diameter) of a cross-linked copolymer of methoxyethyl methacrylate (20%), hydroxyethyl methacrylate (78%) and 1,5-divinyloxy-3-oxapentane (2%) was polymerized a mixture of polyoxyethylene glycol (10%), methoxyethyl methacrylate (9%), and hydroxyethyl methacrylate (81%) along with 2 g. of 1,5-divinyloxy-3-oxapentane per 100 g. of mixture and 0.5 g. AIBN per 100 g. of mixture at 45° C. for 48 hours. The composite rod was cured at 60° C. for 10 hours. The material was turned down to a diameter of 14 mm. and lenses were fabricated. The lens on hydration resulted in a hard-soft lens having a center to edge hardness ratio of 1.06:1. No distortion nor stress was observed in either the center or edge zones of the lens.

EXAMPLE IV

Around a rod (6 mm. diameter) of a cross-linked copolymer of methoxyethyl methacrylate (20%), hydroxyethyl methacrylate (76.5%), 1,5-divinyloxy-3-oxapentane and a monomer derived from allylamine and a reactive dye (I.C.I. America's Procion Brilliant Blue) was polymerized a mixture of polyoxyethylene glycol (10%), methoxyethyl methacrylate (9%), and hydroxyethyl methacrylate (81%) along with 2 g. of 1,5-divinyloxy-3-oxapentane per 100 g. of mixture and 0.5 g. AIBN per 100 g. of mixture of 45° C. for 48 hours. The composite rod was cured at 60° C. for 10 hours. The material was turned down to a diameter of 14 mm. and a lens was fabricated. The lens on hydration resulted in a hard-soft lens having a center to edge hardness ratio of 1.09:1. No distortion nor stress was observed in either the center or edge zones of the lens. The lens had a transparent blue center portion and an uncolored edge portion.

EXAMPLE V

The lens as described in Examples I–III was formed except that the surrounding polymerization mixture contained 1.5 grams per 100 grams of mixture of a monomer derived from allylamine and a reactive dye (Procion dye Brilliant Blue). A lens was formed having a transparent and uncolored central portion with an unstressed and undistorted colored peripheral skirt.

EXAMPLE VI

Lenses having a hydrophobic center and a soft hydrophilic edge were formed following the steps outlined in Examples I–III above by substituting a 6 mm. central rod made of methyl methacrylate (99%) polymerized with ethyleneglycol dimethacrylate (1%). These lenses exhibited a hard center and softer peripheral edge without observable stresses or distortions and provided for greater fluid circulation due to the hydrophobic center.

EXAMPLE VII

A 14 mm. rod was obtained by the polymerization of a mixture containing 2-hydroxyethyl methacrylate (56%), methoxyethyl methacrylate (14%), polyoxyethyleneglycol Mol. Wt. 6000 (30%) along with 2 g./100 g. of 1,5-divinyloxy-3-oxapentane and 0.5g./100g. of AIBN as catalyst at 42° C. for 24 hours and further curing at 60 deg. for 10 hours. A 6 mm. hole was drilled at the center and a mixture of 2-hydroxyethyl methacrylate (58%), methoxyethyl methacrylate (40%), 1,5-divinyloxy-3-oxapentane (2%) and 0.5 g. of AIBN per 100 g. of mixture was polymerized therein at 40° C. for 24 hours with further curing for 10 hours at 60° C. A lens was cut from the material which upon hydration gave a hard-soft lens with a hardness ratio from the center to the edge in terms of water content of 2:1.

EXAMPLE VIII

Around a 6 mm. diameter rod of cross-linked copolymer of methyl methacrylate (40%), 2-hydroxyethyl methacrylate (58%) and 1,5-divinyloxy-3-oxapentane (2%) was polymerized a mixture of 2-hydroxyethyl methacrylate (56%), methyl methacrylate (14%), polyethylene glycol M. W. 6000 (30%) along with 2 g. of 1,5-divinyloxy-3-oxapentane per 100 g. and 1.0 g. of AIBN per 100 g. of mixture at 40° C. for 48 hours with further curing at 60° C. for 10 hours. A lens cut from the material on hydration resulted into a hard-soft lens with the hardness from the center to the edge in the ratio of 15 to 1 in terms of water content.

It has been found that the hardness ratios of the center portion to the outer portion may be varied from 1:1 to 50:1 by adjusting the respective compositions of the center and the edge materials. It has been found that suitable compositions for the center and edge materials may vary in the following ranges and result in acceptable properties for a relatively hard center portion surrounded by a hydrophilic peripheral skirt portion:

|  |  | Acceptable Range | Preferred Range |
|---|---|---|---|
| A. | Central Portion |  |  |
|  | Water soluble vinyl monomer | Up to 100% | 10 – 70% |
|  | Water insoluble hydrophilic monomer | Up to 100% | 30 – 90% |
|  | Cross-linking agent | Up to 20% | 1 – 5% |
|  | Catalyst | 0.1 – 1.0% | 0.2 – 0.5% |
| B | Peripheral Skirt |  |  |
|  | Water Soluble vinyl monomer | 5 – 90% | 5 – 90% |
|  | Water insoluble hydrophilic monomer | 10 – 100% | 10 – 90% |
|  | Cross-linking agent | Up to 20% | 1 – 5% |
|  | Catalyst | 0.1 – 1.0% | 0.2 – 0.5% |
|  | Water soluble inert substance | Up to 50% | 5 – 40% |

All percentages expressed as weight percent.

Examples of water soluble vinyl monomers which may be used with varying degrees of success are:

(1) Hydroxyalkyl methacrylates and acrylates with the alkyl groups having from 2 to 6 carbon atoms.
(2) Vinyl hydroxy acetate, vinyl hydroxy propionate, vinyl hydroxy butyrate.
(3) N-vinyl lactams namely N-vinyl pyrrolidone, N-vinyl caprolactam and N-vinyl piperidone.
(4) N,N Dialkyl amino ethyl methacrylates and acrylates with the alkyl groups having from 0 to 2 carbon atoms.
(5) Hydroxyalkyl vinyl ethers with the alkyl groups having 2 to 4 carbon atoms.
(6) 1-vinyloxy 2-hydroxyethylene, 1-vinyloxy 5-hydroxy 3-oxapentane, 1-vinyloxy 8-hydroxy 3,6-dioxaoctane, 1-vinyloxy 11-hydroxy 3,6,9-trioxaundecane and 1-vinyloxy 14-hydroxy 3,6,9,12 tetraoxatetradecane.
(7) N-vinyl morpholine.
(8) N,N dialkyl acrylamide with the alkyl groups having from 0 to 2 carbon atoms.
(9) Alkyl vinyl ketone with the alkyl group having 1 to 2 carbon atoms.
(10) N-vinyl succinimide and N-vinyl glutarimide.
(11) N-vinyl imidazole.
(12) N-vinyl 3-morpholinone.

Examples of water insoluble hydrophilic monomers which may be used with varying degrees of success in combination with certain of the above water soluble vinyl monomers are:

(1) Methoxyethyl and ethoxyethyl acrylate and methacrylate.
(2) Vinyl methoxy acetate, propionate and butyrate.
(3) Vinyl ethoxy acetate, propionate and butyrate.
(4) Methoxy alkyl and alkoxyalkyl vinyl ethers with the alkyl groups having 1 to 4 carbon atoms.

Examples of water soluble inert substances compatible with the monomers and polymers, to be incorporated within the polymeric matrix include:

(1) Polyoxyethylene glycol, polyoxypropylene glycol, polyoxybutylene glycol, M. W. 1000 to 100,000.
(2) Benzoic, Toluic, Napthoic acids.
(3) Esters and ethers of polyoxyethylene glycols, polyoxypropylene glycol and polyoxybutylene glycol, M. W. 1,000 to 100,000.
(4) Soaps and surfactants.
(5) Polyvinyl pyrrolidone, polyvinyl caprolactam, polyvinyl piperidone.
(6) N-acetyl polyethylene imine.
(7) Poly-N-vinyl imidozole, poly-N-vinyl succinimide, poly-N-vinyl glutaramide.

Examples of suitable cross-linking agents for use are:

(1) Vinyl acrylate and methacrylate.
(2) Allyl acrylate and methacrylate.
(3) Diacrylates and Dimethacrylates of polyoxyethylene, polyoxypropylene and polyoxybutylene glycols.
(4) Triacrylate and trimethacrylate of glycerol.
(5) Triallylcyanurate.
(6) Olefin glycol dimethacrylates.
(7) Allyl diglycol carbonate.
(8) Triallylcyanurate.
(9) Diallyl carbonates and polyallyl carbonates of dihydroxy or polyhydroxy compounds.
(10) Divinyl and polyvinyl carbonates of dihydroxy or polyhydroxy compounds.
(11) Di- or triacrylates and methacrylates of a polyhydroxy compound.
(12) Di- or trivinyl ester of di- or polycarboxylic acids.
(13) Di- or trivinyl ethers of di- or polyhydroxy compounds.
(14) Di- or triallyl ethers of di- or polyhydroxy compounds.
(15) Di- or triallyl esters of di- or polycarboxylic compounds.

The preferred catalyst for use herein is azobisisobutyronitrile. Many other catalysts which induce polymerization and cross-linking may be used with varying degrees of success. For example, various organic peroxides may be used including benzoyl expoxide, chlorobenzoyl peroxide, tertiary butyl peroxy carbonate lauryl peroxide, etc. and many other peroxides that are soluble in the monomer system may be used.

The composite polymer prosthetic devices made possible by this invention have been described specifically by way of the example of a standard type of contact lens. Special application types of contact lenses such as are used as a means for applying medication may readily be fabricated according to the teachings of this invention. Scleral contact lenses, corneal contact lenses, microlenses and special correction lenses such as those containing an artificial iris, central or peripheral opacity, lenses used in cases of albinism, atrophy of the eye or other conditions can all be constructed according to this invention. The presence of a hydrophilic peripheral area provides wearer comfort in all types of lenses and the gradation of physical characteristics from one portion to another of the lens permits versatility heretofor unknown in contact lens manufacture.

Described herein and claimed below is an invention in polymeric prosthetic devices including such items as contact lenses, body inserts, cardiovascular devices and other applicances which are intented to operate in an aqueous environment in which distortion and stresses between the elements making up such prosthetic devices must be minimized and wherein a hydrophilic polymer is utilized for at least a portion of such prosthetic devices.

In specific embodiments this invention provides for a contact lens embodying a non-homogeneous structure having at least a portion thereof hydrophilic in which stresses and distortions are minimized by adding to the hydrophilic polymer matrix a quantity of a water soluble substance removable by exposure to water such as during the hydration of the lens for use. The resulting lens has the comfort of a soft lens and the ability to correct vision and provide visual acuity of a conventional hard plastic lens.

Many modifications to the composition of matter, methods and devices disclosed herein will be readily apparent to those skilled in the arts of polymer chemistry, ophthalmology and related arts and sciences in view of the invention disclosed herein and through an understanding of the appended claims.

The embodiments of the invention in which an exclusive property or privilege is claimed are defined as follows:

1. A contact lens comprising a center lens portion and a peripheral skirt portion attached thereto, said center lens portion having a greater hardness than said peripheral skirt portion, said peripheral skirt portion comprising a hydrophilic, normally water swellable, polymer matrix compatible with the material forming said center lens portion, said peripheral skirt portion being relatively free of stress and distortion and containing a water soluble solid inert substance dissolved throughout the polymer matrix before hydration; said substance being removed from said matrix during hydration of said hydrophilic polymer.

2. The contact lens of claim 1 wherein said center lens portion comprises a hydrophilic polymer.

3. The contact lens of claim 1 wherein said center lens portion comprises a cross-linked copolymer of from 30 to 90% by weight of a water insoluble hydrophilic monomer, and 10 to 70% by weight of a water soluble vinyl monomer and a minor amount up to 20% by weight of a cross-linking agent.

4. The contact lens of claim 1 wherein said substance is polyoxyethylene glycol.

5. The contact lens of claim 1 wherein said peripheral skirt portion comprises a copolymer of from 10 to 95% by weight of an hydroxyalkyl acrylate or methacrylate, from 5 to 90% by weight of a hydrophilic water insoluble monomer, and up to 10% by weight of a cross-linking agent with a minor amount up to 40% by weight of a water soluble inert substance dispersed throughout said copolymer.

6. The contact lens of claim 1 wherein said center lens portion is a cross-linked copolymer consisting essentially of from 10 to 70% by weight hydroxyethyl methacrylate, from 30 to 90% by weight of methoxyethyl methacrylate, and a minor amount up to about 20% by weight of a cross-linking monomer and wherein said peripheral skirt portion is a cross-linked copolymer of from 10 to 95% by weight hydroxyethyl methacrylate, from 5 to 90% by weight of methoxyethyl methacrylate, a minor amount up to 10% by weight of a cross-linking monomer and having a minor amount up to 40% by weight of a water soluble solid inert substance dispersed throughout said copolymer before hydration.

7. The contact lens of claim 1 wherein said water soluble inert substance is present in said polymer matrix before hydration in approximate volumetric equivalence to the water absorbed in said polymer matrix after hydration.

8. The contact lens of claim 1 wherein said inert substance is chosen from the group consisting of:
(1) Polyoxyethylene glycol, polyoxypropylene glycol, polyoxybutylene glycol, M.W. 1000 to 100,000,
(2) Benzoic, Toluic, Napthoic acids,
(3) Esters and ethers of polyoxyethylene glycols, polyoxypropylene glycol and polyoxybutylene glycol, M.W. 1000 to 100,000,
(4) Soaps and surfactants,
(5) Polyvinyl pyrrolidone, polyvinyl caprolactam, polyvinyl piperidone,
(6) N-acetyl polyethylene imine,
(7) Poly-N-vinyl imidozole, poly-N-vinyl succinimide, poly-N-vinyl glutaramide.

* * * * *